United States Patent
Kim

(10) Patent No.: US 10,834,557 B2
(45) Date of Patent: Nov. 10, 2020

(54) LAYERED MACHINE TO MACHINE (M2M) SERVICE METHODOLOGY USING CLASS-BASED ACCESS POINT NAMES (APNS) FOR THE INTERNET OF THINGS

(71) Applicant: Aeris Communications, Inc., Santa Clara, CA (US)

(72) Inventor: Dae Seong Kim, Campbell, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 13/766,113

(22) Filed: Feb. 13, 2013

(65) Prior Publication Data

US 2014/0226641 A1   Aug. 14, 2014

(51) Int. Cl.
| | |
|---|---|
| H04W 4/70 | (2018.01) |
| H04L 29/12 | (2006.01) |
| H04L 12/851 | (2013.01) |
| H04L 12/927 | (2013.01) |
| H04L 12/801 | (2013.01) |
| H04W 88/08 | (2009.01) |

(52) U.S. Cl.
CPC ............ H04W 4/70 (2018.02); H04L 47/14 (2013.01); H04L 47/24 (2013.01); H04L 47/803 (2013.01); H04L 61/303 (2013.01); H04L 61/3075 (2013.01); H04W 88/08 (2013.01)

(58) Field of Classification Search
CPC ... H04W 40/02; H04W 76/025; H04W 48/17; H04W 84/045; H04W 88/06; H04W 4/70; H04W 88/08; H04L 47/14; H04L 47/24; H04L 47/803; H04L 61/303; H04L 61/3075

USPC ..... 370/310, 328, 329, 331; 455/404.1, 406, 455/408, 418
See application file for complete search history.

(56) References Cited

U.S. PATENT DOCUMENTS

| | | | |
|---|---|---|---|
| 6,553,006 B1 * | 4/2003 | Kalliokulju et al. | ......... 370/310 |
| 7,564,776 B2 | 7/2009 | Hermsmeyer et al. | |
| 7,787,492 B2 | 8/2010 | Timus et al. | |
| 8,432,871 B1 | 4/2013 | Sarnaik et al. | |
| 8,565,755 B1 | 10/2013 | Ramachandra et al. | |

(Continued)

FOREIGN PATENT DOCUMENTS

EP       2642817       9/2013

OTHER PUBLICATIONS

Larry Tichavsky Vodafone, "The Rise of the Machine: The Vodafone Global M2M Services Platform, Focus Area: Tomorrow's Technology Today (TTT), Session #: TB015SN", 2013.

(Continued)

*Primary Examiner* — Michael Thier
*Assistant Examiner* — Prince A Mensah
(74) *Attorney, Agent, or Firm* — Brundidge & Stanger, P.C.

(57) ABSTRACT

The present invention relates generally to network communications, and more particularly to machine-to-machine (M2M) data communications. The present invention provides for a method, apparatus and computer program product for providing class-based Access Point Names (APNs) and service class layers for a machine-to-machine (M2M) network. The class oriented APNs are defined and assigned in relation to one or more characteristics of resource type, M2M application, quality of service (QoS), and bearer management.

27 Claims, 5 Drawing Sheets

(56) References Cited

U.S. PATENT DOCUMENTS

| | | |
|---|---|---|
| 2004/0032828 A1 | 2/2004 | Satt et al. |
| 2007/0169107 A1 | 7/2007 | Huttunen |
| 2008/0123660 A1 | 5/2008 | Sammour et al. |
| 2009/0067372 A1 | 3/2009 | Shah et al. |
| 2010/0124198 A1 | 5/2010 | Wong |
| 2011/0039526 A1* | 2/2011 | Ait-Ameur .................. 455/418 |
| 2011/0063997 A1 | 3/2011 | Gras et al. |
| 2011/0199905 A1 | 8/2011 | Pinheiro et al. |
| 2011/0213871 A1 | 9/2011 | DiGirolamo et al. |
| 2011/0320620 A1* | 12/2011 | Cutler ................. H04L 41/5029 709/229 |
| 2012/0004003 A1 | 1/2012 | Shaheen et al. |
| 2012/0047551 A1 | 2/2012 | Pattar et al. |
| 2012/0064878 A1* | 3/2012 | Castro Castro et al. ...... 455/418 |
| 2012/0082029 A1* | 4/2012 | Liao .................... H04W 76/025 370/230 |
| 2012/0099428 A1 | 4/2012 | Kamdar et al. |
| 2012/0113865 A1* | 5/2012 | Zhao .................... H04W 48/20 370/254 |
| 2012/0113937 A1* | 5/2012 | Aramoto et al. ............. 370/329 |
| 2012/0117140 A1 | 5/2012 | Wang et al. |
| 2012/0142306 A1 | 6/2012 | Shah |
| 2012/0163369 A1* | 6/2012 | Draznin et al. ............... 370/352 |
| 2012/0188895 A1 | 7/2012 | Punz et al. |
| 2012/0213072 A1* | 8/2012 | Kotecha ............ H04W 28/0268 370/235 |
| 2012/0221955 A1 | 8/2012 | Raleigh et al. |
| 2012/0231828 A1 | 9/2012 | Wang et al. |
| 2012/0246325 A1 | 9/2012 | Pancorbo Marcos et al. |
| 2012/0257556 A1 | 10/2012 | Jung et al. |
| 2012/0257571 A1 | 10/2012 | Liao |
| 2012/0263083 A1* | 10/2012 | Zhou .................... H04W 72/121 370/310 |
| 2012/0281530 A1 | 11/2012 | Sambhwani et al. |
| 2012/0281581 A1 | 11/2012 | Liu |
| 2012/0287844 A1 | 11/2012 | Ophir et al. |
| 2012/0287854 A1 | 11/2012 | Xie et al. |
| 2012/0307798 A1* | 12/2012 | Zhou ...................... H04W 4/00 370/331 |
| 2013/0013741 A1 | 1/2013 | Norp et al. |
| 2013/0013792 A1 | 1/2013 | Norp |
| 2013/0016657 A1* | 1/2013 | Muhanna ................ H04W 4/70 370/328 |
| 2013/0017827 A1 | 1/2013 | Muhanna et al. |
| 2013/0051231 A1* | 2/2013 | Cai ...................... H04W 28/22 370/230 |
| 2013/0051326 A1 | 2/2013 | Jeyatharan et al. |
| 2013/0077484 A1 | 3/2013 | Zhao et al. |
| 2013/0102356 A1* | 4/2013 | Shaw .................... H04W 48/20 455/525 |
| 2013/0121145 A1* | 5/2013 | Draznin .............. H04L 12/5692 370/230 |
| 2013/0149987 A1* | 6/2013 | Cheng et al. ............. 455/404.1 |
| 2013/0329653 A1 | 12/2013 | Russell, Jr. et al. |
| 2013/0336222 A1 | 12/2013 | Lu et al. |
| 2014/0141743 A1* | 5/2014 | Shaw .................. H04L 41/0816 455/405 |
| 2014/0143390 A1 | 5/2014 | Umapathy et al. |
| 2014/0161026 A1* | 6/2014 | Stojanovski et al. ......... 370/328 |

OTHER PUBLICATIONS

Najah Abu Ali, et al., "Quality of Service in 3GPP R12 LTE-Advanced", IEEE Communications Magazine, pp. 103-109, Aug. 2013.

Puneet Jain, et al., "Machine Type Communications in 3GPP Systems", IEEE Communications Magazine, pp. 28-35, Nov. 2012.

Jussi Marjamaa, "A measurement-based analysis of machine-to-machine communications over a cellular network", Aalto University School of Electrical Engineering, Jan. 6, 2012.

International Search Report and the Written Opinion of the International Searching Authority issued for International Application PCT/US2014/016233, dated Jun. 13, 2014.

Greg Page, "Designing Security for Mobile Operators", Cisco Networkers, 2007.

\* cited by examiner

100

Prior Art

190

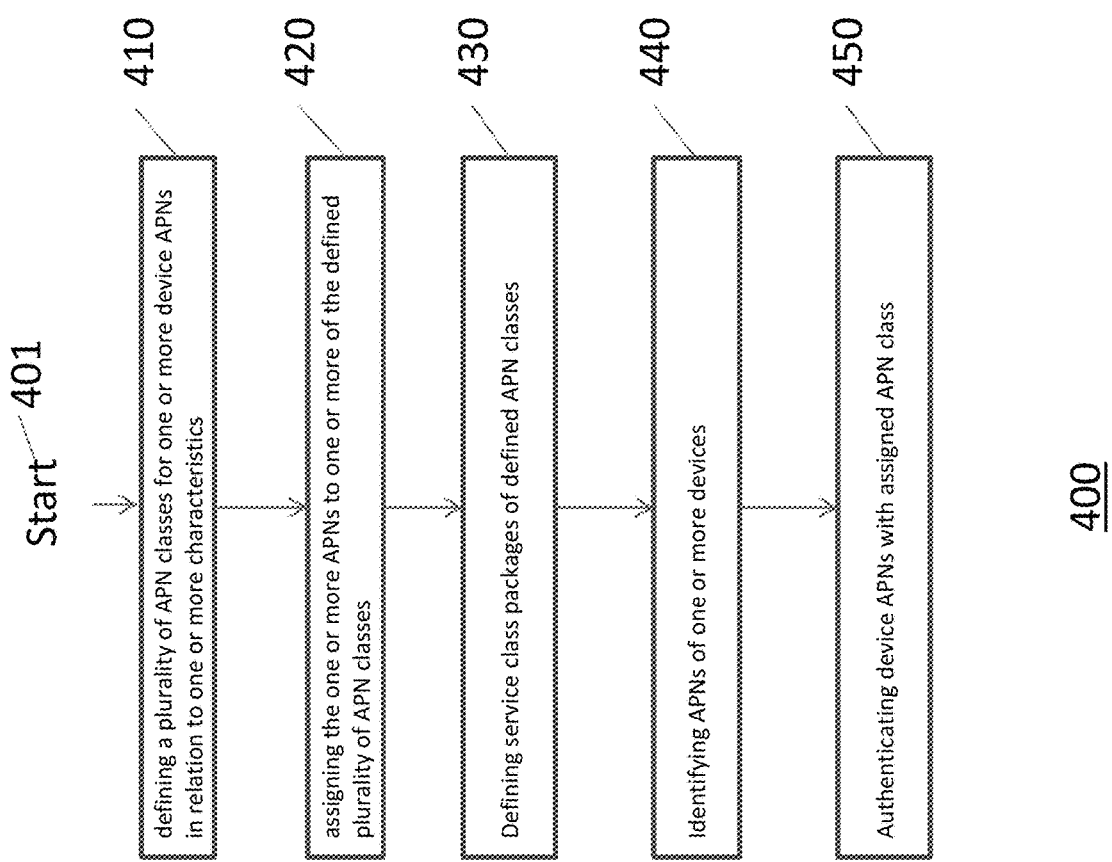

LAYERED MACHINE TO MACHINE (M2M) SERVICE METHODOLOGY USING CLASS-BASED ACCESS POINT NAMES (APNS) FOR THE INTERNET OF THINGS

CROSS-REFERENCE TO CO-PENDING RELATED APPLICATION

This application is related to co-owned and co-pending U.S. patent application entitled "METHOD FOR DELIVERING MACHINE TO MACHINE (M2M) APPLICATION CONTROL DATA OVER CONTROL PLANE IN LTE/EPS UTILIZING STANDARD BEARER MANAGEMENT PROCEDURES", filed on Feb. 13, 2013, as U.S. patent application Ser. No. 13/766,265.

FIELD OF THE INVENTION

The present invention relates generally to network communications, and more particularly to machine-to-machine (M2M) data communications.

BACKGROUND OF THE INVENTION

Many Internet-of-Things (IoT)/Machine to machine (M2M) network communications involve technologies to communicate with other devices often of similar abilities, different from traditional cellular communication networks for instance. In basic M2M environments, a device having limited logic (such as a sensor, meter, etc.) is resident at a location to typically capture measurable event data (such as temperature, pressure, quantity, etc.). The device is connected through a communications network to a remote computer or server having an application layer of specific software. The data received from the device is converted to relevant information associated with the measured event data through the application and may often thereafter undergo analysis or further similar assessment. In many cases a device, when activated, may trigger and communicate the events it is intended for so that those communicated events will then be acted upon by other machines, applications, and/or users on the network.

M2M environments often involve systems of networks, wired and wireless, that are to be connected to the internet and include personal appliances and similar devices. In M2M networks, typically devices may be stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). Often in busy M2M networks, there is an 'always on' device being used such as a general packet radio services (GPRS) or internet gateway. However, M2M communication infrastructure remains most suited to the communication needs and patterns of device having similar abilities, characteristically, for communicating with other systems and device on the same network.

FIG. 1A depicts a basic M2M communication network 100 having typical sensor-type devices 120, 130 and 140. In FIG. 1A, the M2M network 100 has a central communication gateway 110 in which communications from devices 120, 130 and 140 are linked with a service provider network 150. The linkage may be wired or wireless, and is depicted as the security camera 120 and the water alarm sensor 130 are in wireless communication with the gateway 110. Similarly, the traffic camera sensor 140 is in wired communication with the gateway, though one will appreciate that there are many variations to the type and protocol of communication for FIG. 1A.

From FIG. 1A, data sensed and obtained by the devices is transmitted across the M2M network to the service provider network 150 where the data may be shared as raw data or converted to information, often though software applications. Notification equipment 160 wirelessly receives the data from the service provider network 150 and acts in accordance with the received data for the specific event. For instance where the notification equipment is an alert system to send a text to a building owner in the event of a water leak, and the water sensor has sent data indicating a water leak, the notification equipment will then trigger an event to notify the building owner. Similarly, from FIG. 1A, where the user 170 receives a suite of rolling historical data as to traffic camera operation cycles, the user may then act accordingly based on the received cumulative information.

Devices suitable for use with M2M networks often may have multiple access point names (APNs) available for implementation. The APN is the name of a gateway between a GPRS (or 3 G, etc.) mobile network and another computer network, which may often be the public Internet for instance. It will appreciated that APNs are often used in 3GPP data access networks, e.g. general packet radio service (GPRS), evolved packet core (EPC), etc. FIG. 1B sets forth a typical APN format 190 having a network identifier portion (191) and an operator identifier portion (192).

For example, in order for a device to obtain a viable data connection with a carrier, an APN must be configured to present to the carrier. In operation, the carrier will then examine this presented identifier to determine what type of network connection should be created. A carrier may determine in one or more instances for example what IP addresses may be assigned to the device, what security associations should be utilized, etc. Other configurations for an APN for utilization of services may be aligned such as with email, web surfing, custom services, banking services, etc., where each service has its own assigned APN.

Additionally, the APN identifies the packet data network (PDN), that a mobile data user wants to communicate with. In addition to identifying a PDN, an APN may also be used to define the type of service, (e.g. connection to a wireless application protocol (WAP) server, multimedia messaging service (MMS)), that is provided by the PDN. Often in Long Term Evolution (LTE)/Evolution Packet Systems (EPS) and 2 G/3 G packet data in general, PDN access service is offered with a fixed number of APNs (typically one) where there is no difference in the offered APNs other than the differing PDN endpoint. For example, LTE is a 4 G technology.

FIG. 2 sets forth a typical LTE/EPS architecture 200 for a M2M network. From FIG. 2, User equipment (UE) functions include devices 210 and similar. UE functions include a universal subscriber identity module holding authentication information, provide for supporting LTE uplink and downlink air interface and monitoring radios and conveys performance to the evolved node B (eNB) channel quality indicator—220, 224. The Radio Access Network (RAN) portion includes eNBs 220, 224 and communication with the mobility management entity (MME) function 228.

The eNB functions include radio resource management, radio bearer control, radio admission control, connection mobility control and uplink/downlink scheduling, for example. MME selection is also preferably performed by the eNB functions.

The MME functions 228 include non-access stratum (NAS) signaling, NAS signaling security, signaling for mobility between 3GPP access networks (S3), PDN gateway and serving gateway selection, roaming to home subscriber (HSS) 230, bearer management functions, authentication, etc. The HSS is linked with the MME where the HSS provides for storage of subscriber data, roaming restrictions list, accessible access point names (APNs), subscriber data management, and similar.

Communication from the MME 228 to the serving gateway (S-GW) 232 occurs across the core portion of the network as depicted in FIG. 2, where the S-GW provides for local mobility anchor inter eNB handover (such as from eNB 224), packet routing/forwarding, transport level packet uplinking and downlinking, accounting on user and QoS class identifier granularity for inter-operator charging, uplink and downlink charging per UE, packet data node and QoS class identifier, etc.

Communication between the S-GW and PDN Gateway (P-GW) 234 occurs as depicted in FIG. 2 where the P-GW provides for a PDN gateway, per-user packet filtering, UE internet protocol (IP) address allocation, transport level packet marking for downlinking, uplink/downlink service level charging and rate enforcement, etc. The P-GW communicates with the Public Data Network 248, where for providing data transmission services. The P-GW also communicates with the Policy and charging rules function (PCRF) 236.

The PCRF provides for interfaces and application functions such as proxy-call session control function (P-CSCF), interfaces with the PDN gateway to convey policy decisions to it, treatment of services in the PDN gateway in accordance with a user subscription policy, and similar. The PCRF communicates such information with the applications portions of the network including an IP Multimedia Subsystem (IMS) 240 and through applications 242.

FIG. 3 sets forth an exemplary bearer architecture 300 showing logic relationships across a EUTRAN to EPC to PDN. The EUTRAN is also known as an e-UTRA, being the air interface of 3GPP's Long LTE upgrade path for mobile networks (Evolved UMTS Terrestrial Radio Access Network). From FIG. 3, the EPS bearer is an end-to-end tunnel defined to a specific QoS at 360, where the tunnel traverses UE 310, eNB 320, S-GW 330, P-GW 340 and Peer entity 350. Planes between logic functions such as S1, being a user plane between the eNB and serving gateways, are provided for in FIG. 3 as LTE-UU, S1, S5-S8 (Signaling interfaces), and SGi (interface into the IP PDN). Similarly, the bearer architecture provides for an EPS bearer 362 which has four parameters including a QoS class identifier, allocation and retention policy (ARP), guaranteed bit rate or max bit rate (MBR), and aggregate maximum bit rate (AMBR). An external bearer not having a MBR is provided for at 364. A radio access bearer (E-RAB) 370, S5-S8 bearer 372 and radio bearer 374 are also logically depicted in FIG. 3.

From FIG. 3, logically, each EPS bearer context represents an EPS bearer between the UE and a PDN. EPS bearer contexts can remain activated even if the radio and S1 bearers 376 constituting the corresponding EPS bearers between UE and MME are temporarily released. An EPS bearer context can be either a default bearer context or a dedicated bearer context. A default EPS bearer context is activated when the UE requests a connection to a PDN. The first default EPS bearer context, is activated during the EPS attach procedure. Additionally, the network can activate one or several dedicated EPS bearer contexts in parallel Returning to the APN, it will be appreciated that for such networks and architectures, each APN is essentially the same, where the APN may be assigned to a particular service and the only difference between one APN assigned to email and another APN assigned to banking service, for instance, is that each assigned APN has a differing PDN endpoint. This arbitrary assignment of APNs does not employ an efficient and effective methodology for obtaining an optimal use of APNs based on the needs of a user.

Therefore, what is desired is an approach to intelligently allocate and assign APNs of a device with desired performance characteristics of a user in relation to the available service offerings of allocated APNs.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application (i.e., app) or similar while the primary software and data are stored on servers or locations apart from the devices.

SUMMARY OF THE INVENTION

The present invention fulfills these needs and has been developed in response to the present state of the art, and in particular, in response to the problems and needs in the art that have not yet been fully solved by currently available technologies.

One embodiment of the present invention includes a method for assigning class-based Access Point Names (APNs) for a machine-to-machine (M2M) network. The method provides for defining a plurality of APN classes for one or more device APNs in relation to one or more characteristics. The characteristics include those of resource type, M2M application, quality of service (QoS), and bearer management, etc. The method further provides for assigning the one or more APNs to one or more of the defined plurality of APN classes.

Another embodiment of the present invention includes a method for providing one or more layered Access Point Name (APN) service classes each having a plurality of Access Point Names (APNs) suited for a designated service class for a machine-to-machine (M2M) network. The method further includes the one or more service classes having a plurality of APN classes for one or more device APNs in relation to one or more characteristics of the designated service class.

A further embodiment of the present invention includes an apparatus for assigning one or more service classes of device Access Point Names (APNs) for a machine-to-machine (M2M) network. The apparatus includes a device having one or more APNs being capable of communicating with a server system across the network using a communication adapter; the server system having an application module for defining a plurality of services classes for the one or more APNs in relation to one or more characteristics of resource type, M2M application, quality of service (QoS), and bearer management; and assigning the one or more APNs to one or more of the defined plurality of service classes.

A further embodiment of the present invention includes a computer program product stored on a computer usable medium, comprising: computer readable program means for causing a computer to control an execution of an application to perform a method for assigning class-based Access Point Names (APNs) for a machine-to-machine (M2M) network. The computer program product includes the steps of: defining a plurality of APN classes for one or more APNs in relation to one or more characteristics of resource type, M2M application, quality of service (QoS), and bearer management; and, assigning the one or more APNs to one or more of the defined plurality of APN classes.

The present invention provides an approach to intelligently allocate and assign APNs of a device with desired performance characteristics of a user in relation to the available service offerings of allocated APNs. In so doing, the present invention provides for a layered class service structure and approach having more granular QoS control, dynamic charging, and efficient on-demand resource management across multiple APNs.

DETAILED DESCRIPTION OF PREFERRED EMBODIMENTS

Figure 1A:
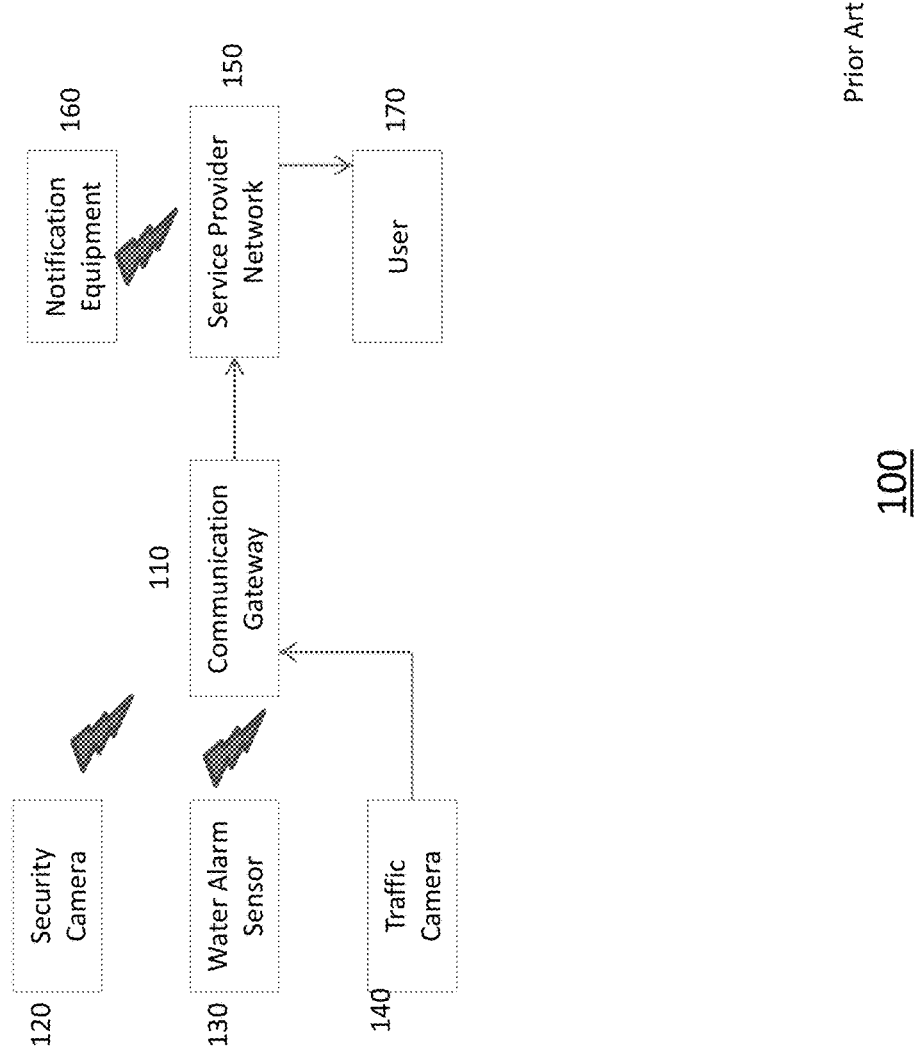
FIG. 1A depicts a basic M2M communication network having typical sensor-type devices.
Figure 1B:
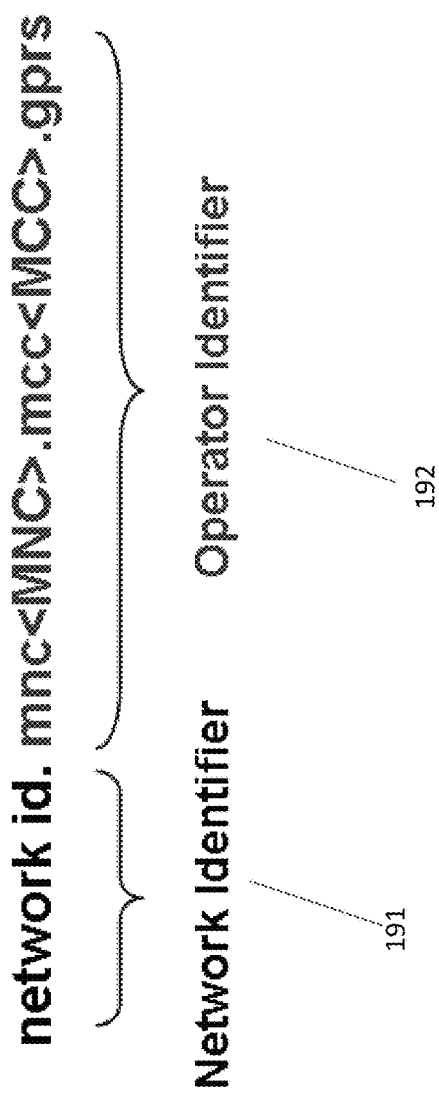
FIG. 1B sets forth a typical APN format having a network identifier portion and an operator identifier portion.
Figure 2:
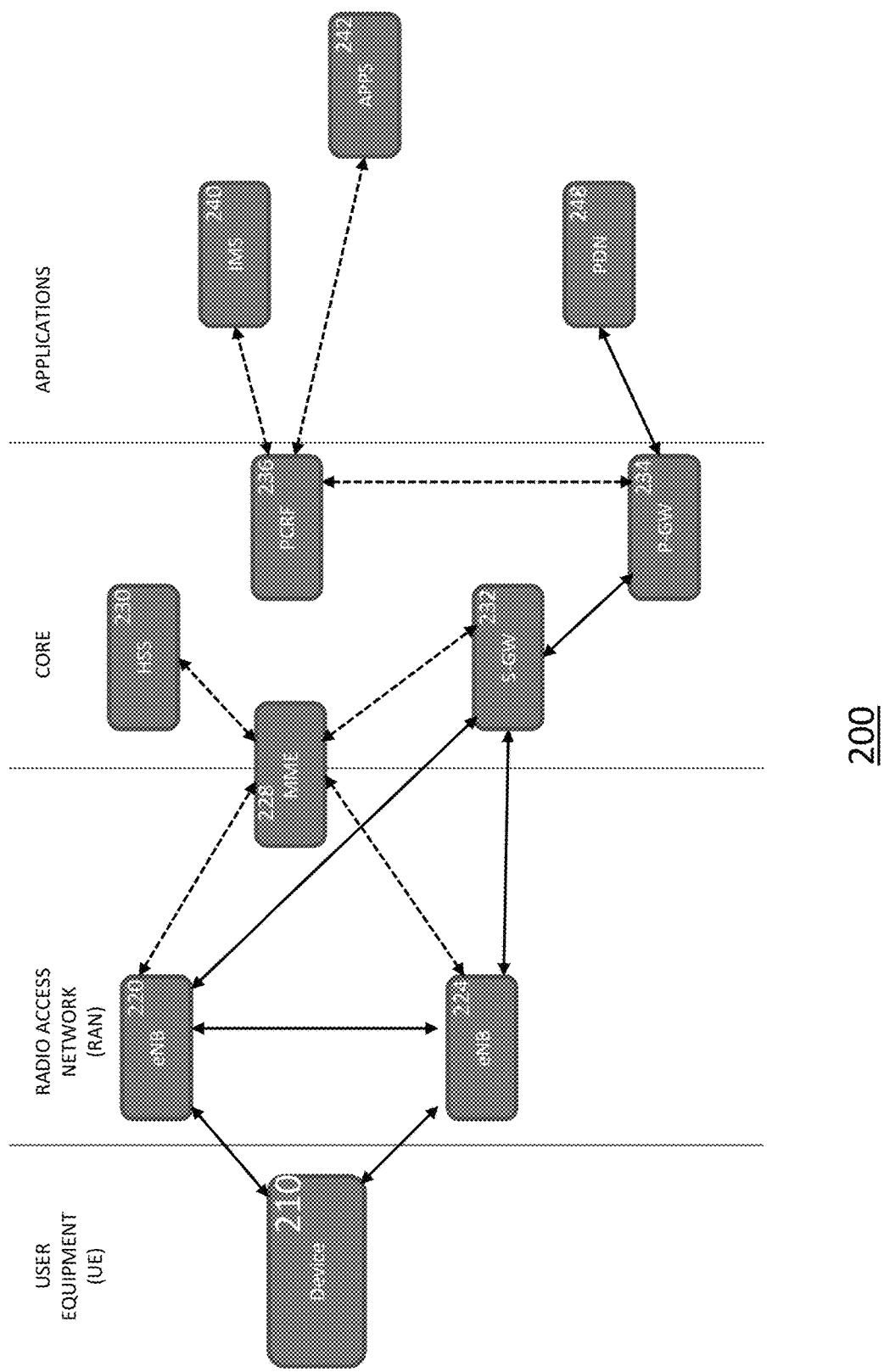
FIG. 2 sets forth a typical LTE/EPS architecture for a M2M network.
Figure 3:
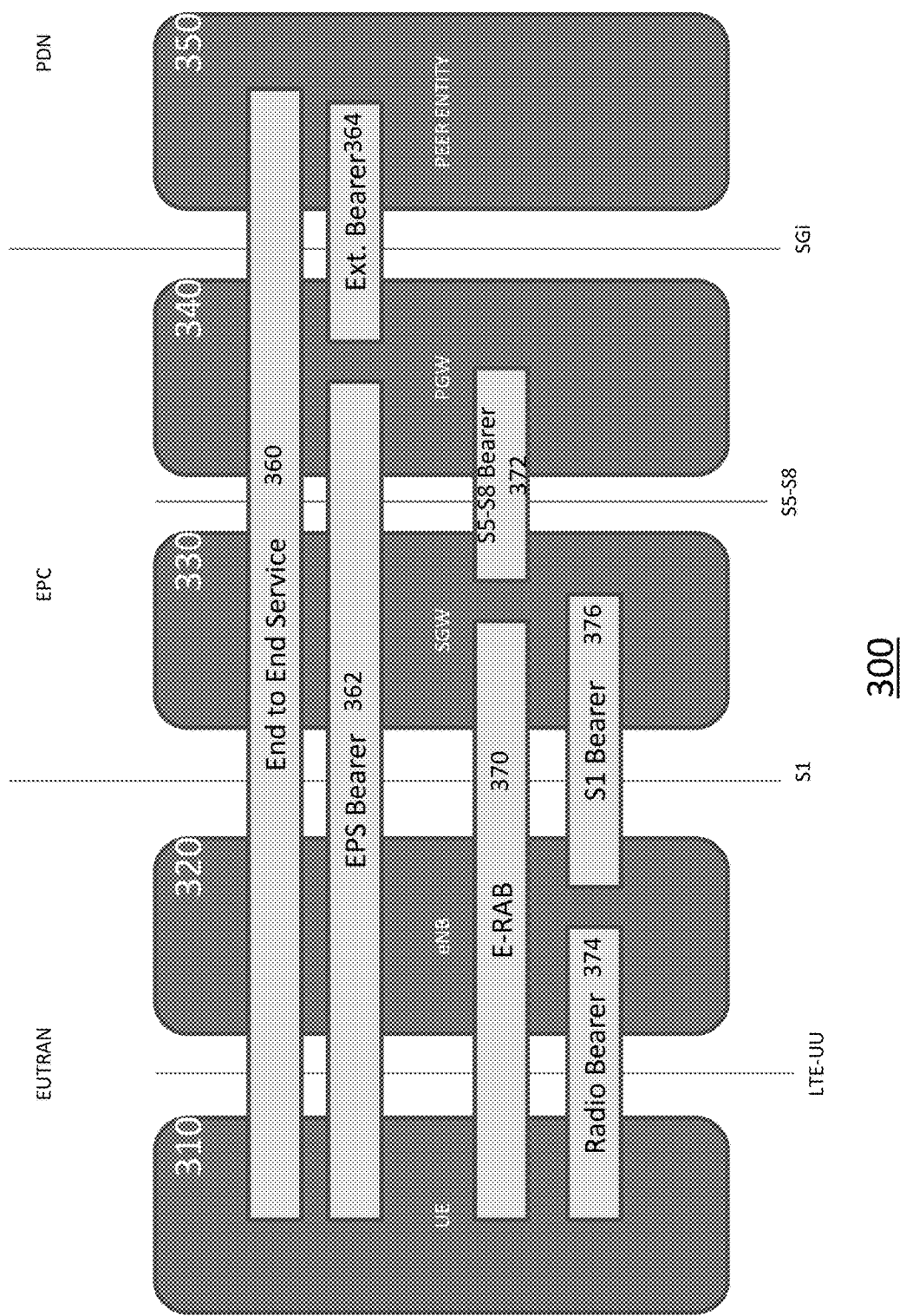
FIG. 3 sets forth an exemplary bearer architecture showing logic relationships across a EUTRAN to EPC to PDN; and, FIG. 4 sets forth one embodiment of the present invention providing for a method for assigning class-based Access Point Names (APNs) for a machine-to-machine (M2M) network.

The present invention relates generally to network communications, and more particularly to machine-to-machine (M2M) data communications.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Mobile devices are able to connect to a M2M network once they are authenticated and authorized. Often a device's credentials or authority is obtained through an authentication, authorization and accounting (AAA) network in communication with the M2M network. Once a device is authenticated and authorized, the device may often be automatically configured with DNS, routing information and an IP address AAA. Similarly, the authentication occurs only where the APN of the device is in alignment with the communication requirements of the M2M network.

FIG. 4 sets forth one embodiment of the present invention providing for a method 400 for assigning class-based Access Point Names (APNs) for a machine-to-machine (M2M) network. The method starts at 401 and may proceed in identifying one or more classes of APNs for one or more devices to be in communication with the M2M network at 410.

The method provides for defining a plurality of APN classes at 410 for one or more device APNs in relation to one or more characteristics. The characteristics to be considered by the present invention at 410, without limitation, include those of resource type, M2M application, quality of service (QoS), traffic, traffic pattern, packet data network (PDN) access requirement, sponsorship, advertising, EPS session management, bearer management, etc. The characteristics to be considered may also be determined to be categorized into various resource types, for instance. A resource type may include device control, controlled service, sponsored service access, user, IP Multimedia Subsystem (IMS), over-the-top (OTT), etc. Further, requirements for a plurality of characteristics may be associated with a particular APN class or resource type, and an arrangement of the associated APNs into classes may be defined by the present invention.

The term IMS is intended to mean the IP Multimedia Subsystem or IP Multimedia Core Network Subsystem (IMS) which is an architectural framework for delivering IP multimedia services. The term OTT or "over-the-top" generally refers to the delivery of content and services over an infrastructure that is not under the same administrative control as the content or service provider. The term sponsored service access may generally be understood to include but not be limited by a predetermined arrangement by a sponsor to provide condition or provisional access to a user through a subscription, sponsor, advertising, subsidy, or similar support or assisted mechanism where a user receives access to a sponsor service due in part to the sponsorship by the sponsor; such an approach may require a subscription, user agreement, condition of use by the user, or similar. For instance, a sponsored APN may include a special APN in the EPC through which free or low-cost PDN access is provided to M2M subscribers, and in which a network and/or application requirement from the paying "sponsor" is associated with the special offering (e.g. push advertisement).

It will be appreciated that the present invention may relate one or more characteristics with one or more other characteristics in the determination of an APN class. For instance, a first class may be defined as "Class 1" having an application characteristic of "for device control only." Similarly, in a separate and distinct arrangement, a first class may be defined as "Class 1" having application characteristics of "PDN access to controlled destination only" and having a QoS of being "dynamic." The present invention is not limited in its relating of characteristics to a particular defined class.

At 420, the present invention provides for assigning the one or more APNs to one or more of the defined plurality of APN classes of 410. The present invention may anticipate the APNs to be encountered for the M2M network, may have user information to better define the APNs intended, or may use other sources or requirements of information. The present invention may also assign APNs to specific classes where the use of such assigned AMPNs may or may not be operational based on the available APNs actually available.

At 430, the present invention, in one or more preferred embodiments, further defines a service class or service package which layers the defined classes of APNs into the service class definitions. Preferably the service class definitions are arranged to provide specific levels of service to intended users based upon anticipated user needs, where often it will be appreciated that the level of service provided by the service class may also be economically oriented. For instance, a service class offered may be that for alarms which also has a requirement that information usage would typically be infrequent. Similarly, a service class of entertainment or streaming video may have data characteristics that require high bandwidth and particularly heavy use at predetermined times.

At 440, the present invention, in one or more preferred embodiments, further identifies the available APNs or anticipated APNs of one or more devices to be used across the M2M network and allocates those APNs for use in accordance to the desired or prescribed service class, or alternatively the APN class. Operationally, at 450, the allocated device APNs are then able to be authenticated or enabled for content via the network or an intermediary in accordance with the subscribed service class and availability of assigned APN.

In a preferred embodiment, a first APN class is defined to be distinct from a second APN class by a plurality of characteristics, such that there is performance, cost, or user benefit to having a variety of APN classes to employ. Similarly, a first service class is defined to be distinct from a second service class by a plurality of characteristics, such that there is performance, cost, or user benefit to having a variety of service classes to employ.

For instance, in Table 1 below, an arrangement of defined classes using the present invention is set forth.

service requiring a dynamic QoS while that of APN Class 5 is a User resource type having a non-GBR QCI QoS.

In a further preferred embodiment, the present invention is able to accommodate the use of tiered QoS and bearer control based upon sponsor level and/or service level. As used herein the term sponsor APN is intended to mean a special APN in the EPC through which free or low-cost PDN access is provided to M2M subscribers, and with which a network and/or application hook from the paying "sponsor" can be associated for their special offering (e.g. push advertisement). Concurrently, a sponsor level is intended to mean that type of sponsored APN where it is possible to any of and more of the following format types benefiting the sponsor:

"ad-based.telematics-infotainment.aeriseps.net"
"qos-based.telematics-infotainment.aeriseps.net"
"vehicle-to-vehicle.telematics.aeriseps.net".

Similarly, a service class or service packages may be arranged having one or more specific APN classes using the present invention. Table 2 sets forth an example of a series of service packages arranged with specific APN classes in accordance with the present invention. The service packages are also referred to as APN-mix, APN-mixed or similar.

| APN package | Member APN classes | Built-in Aeris M2M Control | Application and Data Characteristics | Example Target |
|---|---|---|---|---|
| Barebone | APN class 1 | No | No device initiated traffic | Pay here buy here |

| APN Class | Resource Type | Application Characteristics | QoS | Bearer Management |
|---|---|---|---|---|
| 1 | Device control | For Device control only; No user plane traffic (i.e. no PDN access); Cost sensitive; | "pseudo" QoS; Non-GBR QCI | Default bearer only Overloaded with M2M control messaging |
| 2 | Device control | For Device control only; PDN access to "M2M clearing house" only; Limited user plane traffic; cf. can be combined with "sponsored" APN | Static QoS; Non-GBR QCI | Default bearer overloaded with M2M control messaging Limited/aggregated bearers on-demand bearer allocation low "Bearer TTL" |
| 3 | Controlled service | PDN access to "controlled" destination only; (e.g. Infotainment multimedia stream) (e.g. vehicle-to-vehicle info exchange) Adequate for server-push applications; cf. can be combined with "sponsored" APN | Dynamic, tiered QoS (based on "service level") | Dynamic "Bearer TTL" |
| 4 | Sponsored service access | PDN access through "sponsor" hookup | Dynamic, tiered QoS (based on "sponsor level") | Dynamic "Bearer TTL" |
| 5 | User | For subscribers which are: mostly dormant active only when required Cost sensitive, low traffic applications | Non-GBR QCI | No bearer by default (if possible); Default bearer only (otherwise) on-demand bearer allocation low "Bearer TTL" |
| ... | User | ... | | ... |
| 8 | IMS | For integrated IMS service | | Dynamic "Bearer TTL" |
| 9 | OTT | Always-on | | n/a |

In Table 1, the proposed APN classes 1-9 set forth an exemplar of how the present invention define and assign APNs into specific APN classes in relation to the one or more earlier discussed characteristics.

From Table 1, a resource type is defined as is a QoS and a Bearer Management, though it will be appreciated that there are many other variations within the scope of the present invention. The APN classes are distinct from one another in Table 1, where the APN Class 3 is of a controlled -continued

| APN package | Member APN classes | Built-in Aeris M2M Control | Application and Data Characteristics | Example Target |
|---|---|---|---|---|
| Alarm | APN class 1 APN | Yes | Regular report from device; Infrequent event | ADT home security |

-continued

| APN package | Member APN classes | Built-in Aeris M2M Control | Application and Data Characteristics | Example Target |
|---|---|---|---|---|
| | class 2 | | driven activity from device | |
| Consumer Telematics | APN class 3 APN class 4 | Yes | Irregular report from device; Frequent event driven activity from device; | Consumer telematics with in-vehicle infotainment |
| | APN class 8 | | Conversational traffic from human user | |
| Telemetry | APN class 2 APN class 3 | Yes | Regular report from device; Subscribed to Aeris controlled M2M service | PG&E smart meter |
| . . . | . . . | . . . | . . . | . . . |

From Table 2, an APM package (or service package) is set forth along with an indication of the member APN classes and respective application and data characteristics. For instance, a typical service class may be for a Telematics application where APN classes 2 and 3 would be assigned. The Telematics class would have built-in M2M control (i.e., "yes") and there would be a regular report from device. An example of application need for such a telemetry service class may arise from a smart meter user for instance. By understanding a user's needs and allocation, a user and a provider may be better aligned to provide more cost efficient services with better performance, using the present invention.

Advantageously, the present invention in one or more embodiments provides for class-based PDN access to M2M devices, the ability to create new service package(s) based upon customer's application requirements, and the application of various dynamic charging rates with more granular control.

In a preferred embodiment, a Policy and Charging Rules Function (PCRF) may be deployed using the present invention. The PCRF is the software node designated in real-time to determine policy rules in a multimedia network. Typically the PCRF would be a controller, logic or software component that operates at the network core and accesses subscriber databases and other specialized functions, such as a charging system, in a centralized manner. Because it operates in real time, the PCRF has an increased strategic significance and broader potential role than traditional policy engines. The PCRF is the part of the network architecture that aggregates information to and from the network, operational support systems, and other sources (such as portals) in real time, supporting the creation of rules and then enables an automatic approach to making policy decisions for each subscriber active on the network. Preferably, the PCRF can also be integrated with different platforms like billing, rating, charging, and subscriber database or can also be deployed as a standalone entity. Preferably, in the present invention, a PCRF is used to provide a plurality of definition and assignment rules for executing the steps of defining and assigning.

In a further preferred embodiment, the present invention provides for assigning the one or more APNs to one or more of the defined plurality of APN classes or service classes, and vice versa. It will also be appreciated that one or more APNs may be at or assigned to a device or may be assigned by a network for a device.

In a further embodiment, the present invention provides for self-configuration logic wherein one or more service classes or APN classes may be defined and assigned to a user based on user requirements using logic of the present invention.

Additional utilization of the present invention is envisioned in one or more embodiments where the sources available for integration may be identified and associated with creating or identifying data streams to gather associated data from within the network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

In one or more preferred embodiments, servers and/or back-end servers may include Authentication, Authorization and Accounting (AAA) servers.

Further, the following references are incorporated herein by reference: 3GPP TS 23.203 (http://www.3gpp.org/ftp/Specs/html-info/23203.htm); 3GPP TS 29.212 (http://www.3gpp.org/ftp/Specs/html-info/29212.htm); 3GPP TS 24.301 (http://www.3gpp.org/ftp/Specs/html-info/24301.htm); and, 3GPP TS 23.401 (http://www.3gpp.org/ftp/Specs/html-info/23401.htm).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

What is claimed is:
1. A computer implemented method for assigning class-based Access Point Names (APNs) for a machine-to-machine (M2M) network, comprising the steps of:
defining a plurality of APN classes comprising a first APN class and a second APN class by a network for one or more device APNs based on anticipated user needs, and application characteristics in relation to one or more characteristics of: resource type, quality of service (QoS), and bearer management, wherein service class definitions corresponding to the APN classes are arranged to provide specific levels of service to intended users based upon anticipated user needs and wherein sources available for integration can be identified and associated with creating or identifying data streams to gather associated data from within the network;
wherein the application characteristics comprise any of for device control only, packet data network (PDN) access to M2M clearing house only, PDN access to controlled destination only, adequate for server push applications, PDN access through sponsor hookup, for subscribers which are mostly dormant, or active only when required, for integrated IP multimedia subsystem (IMS) service, always on and combinations thereof;

identifying anticipated APNs of one or more devices to be used across the M2M network and allocating those APNs for use in accordance to the prescribed the APN class; and assigning by the network the one or more device APNs to one or more of the defined plurality of APN classes;

wherein the first APN class is defined to be distinct from the second APN class by a plurality of characteristics.

2. The method of claim 1, wherein the one or more characteristics further includes traffic, traffic pattern, PDN access requirement, sponsorship, advertising, and Evolution Packet Systems (EPS) session management.

3. The method of claim 2, wherein the characteristic of the sponsorship includes a sponsored APN for predetermined packet data network (PDN) access.

4. The method of claim 3, wherein the predetermined PDN access is a reduced cost PDN access for one or more identified M2M subscribers in accordance with the sponsorship.

5. The method of claim 1, further comprising the step of defining a plurality of APN-mix classes in relation to a service class wherein each APN-mix class is comprised of a plurality of at least one or more APN classes.

6. The method of claim 5, wherein each service class is defined in relation to one or more application performance requirements.

7. The method of claim 6, wherein at least one APN-mix class is for a service class of an entertainment service or streaming service having moderate bandwidth requirements.

8. The method of claim 7, wherein at least one APN-mix class is for service class of an information service or security service with low latency requirements.

9. The method of claim 1, further comprising a policy and charging rule function (PCRF) for providing a plurality of definition and assignment rules for executing the steps of defining and assigning.

10. The method of claim 1, wherein the network defining the plurality of APN classes is any of a service provider network, an intermediary or a combination thereof.

11. An apparatus for assigning one or more service classes of device Access Point Names (APNs) for a machine-to-machine (M2M) network, comprising:
a device having one or more APNs being capable of communicating with a server system across the network using a communication adapter;
the server system having an application module for
defining a plurality of services classes comprising a first service class and a second service class for the one or more APNs based on anticipated user needs, and application characteristics in relation to one or more characteristics of: resource type, quality of service (QoS), and bearer management, wherein service class definitions corresponding to the APN classes are arranged to provide specific levels of service to intended users based upon anticipated user needs and wherein sources available for integration can be identified and associated with creating or identifying data streams to gather associated data from within the network;
wherein the application characteristics comprise any of for device control only, packet data network (PDN) access to M2M clearing house only, PDN access to controlled destination only, adequate for server push applications, PDN access through sponsor hookup, for subscribers which are mostly dormant, or active only when required, for integrated IP multimedia subsystem (IMS) service, always on and combinations thereof;

identifying anticipated APNs of one or more devices to be used across the M2M network and allocating those APNs for use in accordance to the prescribed the APN class; and assigning the one or more APNs to one or more of the defined plurality of service classes wherein the first service class is defined to be distinct from the second service class by a plurality of characteristics.

12. The apparatus of claim 11, wherein the server is in communication with one or more receiving devices.

13. The apparatus of claim 12, wherein the application module further includes logic to identify the one or more service classes.

14. The apparatus of claim 12, wherein the application module further includes logic to provide a predetermined specialized service class.

15. The apparatus of claim 12, wherein the application module further includes logic to compare performance of the device across the M2M network in relation to the one or more assigned service classes.

16. The apparatus of claim 15, wherein the application module further includes logic to provide a redefinition or reassignment of one or more service classes in order to provide improved efficiencies.

17. The computer program product of claim 16, further comprising the step of defining a plurality of APN-mix classes in relation to a service class wherein each APN-mix class is comprised of a plurality of at least one or more APN classes.

18. The computer program product of claim 17, wherein at least one APN-mix class is for a service class of a streaming service having moderate bandwidth requirements.

19. The computer program product of claim 17, wherein at least one APN-mix class is for service class of a security service with low latency requirements.

20. The computer program product of claim 16, wherein a policy and charging rule function (PCRF) provides a plurality of definition and assignment rules for executing the steps of defining and assigning.

21. The computer program product of claim 20 including a plurality of devices each having one or more APNs.

22. A computer program product stored on a non transitory computer usable medium, comprising: computer readable program means for causing a computer to control an execution of an application to perform a method for assigning class-based Access Point Names (APNs) for a machine-to-machine (M2M) network, comprising the steps of:
defining a plurality of APN classes comprising a first APN class and a second APN class by a network for one or more device APNs based on anticipated user needs, and application characteristics in relation to one or more characteristics of resource type, quality of service (QoS), and bearer management, wherein service class definitions corresponding to the APN classes are arranged to provide specific levels of service to intended users based upon anticipated user needs and wherein sources available for integration can be identified and associated with creating or identifying data streams to gather associated data from within the network;
wherein the application characteristics comprise any of for device control only, packet data network (PDN) access to M2M clearing house only, PDN access to controlled destination only, adequate for server push applications, PDN access through sponsor hookup, for subscribers which are mostly dormant, or active only when required, for integrated IP multimedia subsystem (IMS) service, always on and combinations thereof;

identifying anticipated APNs of one or more devices to be used across the M2M network and allocating those APNs for use in accordance to the prescribed the APN class; and assigning by the network the one or more device APNs to one or more of the defined plurality of APN classes wherein the first APN class is defined to be distinct from the second APN class by a plurality of characteristics.

23. The computer program product of claim 22, wherein the one or more characteristics further includes traffic, traffic pattern, PDN access requirement, sponsorship, advertising, and Evolution Packet Systems (EPS) session management.

24. The computer program product of claim 23, wherein the predetermined PDN access is a reduced cost PDN access for one or more identified M2M subscribers in accordance with the sponsorship.

25. The computer program product of claim 24, wherein each service class is defined in relation to one or more application performance requirements.

26. The computer program product of claim 22, wherein the characteristic of the sponsorship includes a sponsored APN for predetermined packet data network (PDN) access.

27. The computer product of claim 22, wherein the network defining the plurality of APN classes is any of a service provider network, an intermediary or a combination thereof.

\* \* \* \* \*